United States Patent [19]
Lee

[11] Patent Number: 5,402,288
[45] Date of Patent: Mar. 28, 1995

[54] AUTOMATIC VIDEO-TAPE CASSETTE CHANGING DEVICE

[75] Inventor: Sang-Chun Lee, Puk, Rep. of Korea

[73] Assignee: Daewoo Electronics Co., Ltd., Seoul, Rep. of Korea

[21] Appl. No.: 38,024

[22] Filed: Mar. 29, 1993

[30] Foreign Application Priority Data

Mar. 31, 1992 [KR] Rep. of Korea .............. 92-5398

[51] Int. Cl.⁶ ............................................. G11B 15/68
[52] U.S. Cl. ............................................. 360/92
[58] Field of Search .............. 360/92, 71; 414/798.1, 414/798, 797.4, 797.7, 797.8, 797.9, 790.5, 277, 654–663, 280–283; 369/34–36

[56] References Cited

U.S. PATENT DOCUMENTS

| | | | |
|---|---|---|---|
| 2,822,953 | 2/1958 | Kunath | 414/797.9 |
| 3,765,684 | 10/1973 | Sato | 360/92 |
| 3,797,923 | 3/1974 | Thevenaz | 360/92 |
| 3,886,591 | 5/1975 | Bettini | 360/92 |
| 4,023,207 | 5/1977 | Cook | 360/92 |
| 5,128,816 | 7/1992 | Imazaike | 360/92 |

Primary Examiner—Robert S. Tupper
Assistant Examiner—William J. Klimowicz
Attorney, Agent, or Firm—William F. Pinsak

[57] ABSTRACT

Disclosed herein is an automate cassette changing device adapted to be used in combination with a recording and reproducing apparatus, which comprises a main body having a rectangular-shaped open space suitable for receiving one or more stacked cassettes, a cassette entering inlet provided at a rear wall of the body for supplying the cassette to the apparatus therethrough, and a cassette discharging outlet formed at a side wall of the body for discharging cassettes ejected from the apparatus, projecting pieces provided at a front wall of the body for supporting the stacked cassettes, a pair of cassette feeding mechanisms mounted on the side walls of the body in an opposite relationship with each other for dropping the cassettes in sequence on the bottom surface of the body, and a cassette pusher associated with one of the cassette feeding mechanisms for pushing the lowermost one of the stacked cassettes and separating it from the stacked cassettes.

2 Claims, 5 Drawing Sheets

AUTOMATIC VIDEO-TAPE CASSETTE CHANGING DEVICE

FIELD OF THE INVENTION

The present invention relates to a video-tape cassette changer adapted to be used in a recording and reproducing apparatus such as a video cassette recorder ("VCR"); and, more particularly, to a video-tape cassette changing device capable of feeding automatically and serially a number of cassettes to and extracting them from a VCR during the recording or reproduction operation.

DESCRIPTION OF THE PRIOR ART

In general, a cassette changing device has been used for recording or reproducing a number of cassettes in a VCR. In particular, such a cassette changing device is of great use in cable TV networks, video recording/reproducing operators and the like, because it can exchange automatically a plurality of cassettes without any extra manual labor of the operator. One example of such automatic cassette changers is disclosed in U.S. Pat. No. 4,072,991, which comprises a feed-in magazine for storing a number of cassettes, a feed-out magazine arranged to adjoin the feed-in magazine for storing a number of cassettes removed from a tape recorder, and a cassette pusher for pushing the lowermost cassette in the feed-in magazine under the stack of cassettes into the feed-out magazine. However, since the cassette changing device is designed to exclusively replace audio-tape cassettes, it cannot be employed to exchange the plurality of video-tape cassettes. In addition, the manufacturing cost of the changing device is relatively high as it is made in a rather complicated structure.

A typical video-tape cassette changing device known in the art comprises a magazine detachably mounted in a VCR, a conveyer for supplying serially a number of videocassettes stored in the magazine to the VCR for playing or recording the videocassette, and means for ejecting played or recorded cassettes from the VCR to discharge them out of the magazine. However, this device has the disadvantage in that the cassette dropped on the conveyer from the magazine may become misaligned with a cassette access opening in a front side of the VCR during the exchanging operation of the cassette, thereby failing to insert the cassette into a deck of the VCR. Furthermore, since the lowermost cassette is separated from the stacked cassettes and dropped on the conveyer by the driving operation of the conveyer, the power consumption by the driving motor may be substantial.

SUMMARY OF THE INVENTION

Accordingly, it is an object of the present invention to provide a novel automatic video-tape cassette changing device which is adapted to be used in a VCR.

It is another object of the present invention to provide an automatic cassette changing device which can drop serially one by one a plurality of cassettes in order for the dropped cassettes to be accurately registered with a cassette opening of a VCR during the exchanging operation of cassettes.

It is a further object of the present invention to provide an automatic cassette changing device capable of speedily feeding a plurality of cassettes in sequence into a VCR with lesser power consumption by a driving motor.

The above and other objects of the present invention are accomplished by an automatic video-tape cassette changing device adapted to be used in a VCR, which comprises: a main body having a rectangular-shaped open space formed therein for receiving one or more stacked video-tape cassettes, a cassette entering inlet provided at a rear wall of the main body and communicating with the open space and a cassette access opening of the VCR, and a cassette discharging outlet formed at a side wall of the main body and communicating with the open space for discharging the cassettes ejected from the VCR; projecting pieces provided at a front wall of the main body and adapted for supporting the stack of the cassettes; a pair of cassette feeding mechanisms mounted on the side walls of the main body in an opposite relationship with each other for dropping the cassettes in sequence on the bottom surface of the main body, each of said cassette feeding mechanisms including a driving gear driven by a motor, an intermediate gear engaged with the driving gear, a driven gear meshed with the intermediate gear, and a cutout cylindrical holder integrally formed on a first side of the driven gear and suitable for gripping the lowermost one of the stacked cassettes; and cassette pushing means associated with one of the cassette feeding mechanisms for pushing the lowermost cassette and separating it from the stacked cassettes when the lowermost cassette is released from the cutout cylindrical holder by the actuating operation of the cassette feeding mechanisms.

The cassette pushing means includes an eccentric cam provided at a second side of the driven gear, a cam following slide plate in contact with the eccentric cam, a pushing lever hinged at an end portion of the slide plate and rotatably pivoted at a pin fixed to a partition of the main body, and means for biasing the slide plate against the eccentric cam.

BRIEF DESCRIPTION OF THE DRAWINGS

The above and other objects, advantages, and features of the present invention will be apparent from the following descriptions, taken in conjunction with the accompanying drawings, wherein.

DETAILED DESCRIPTION OF THE PREFERRED EMBODIMENTS

Figure 1:
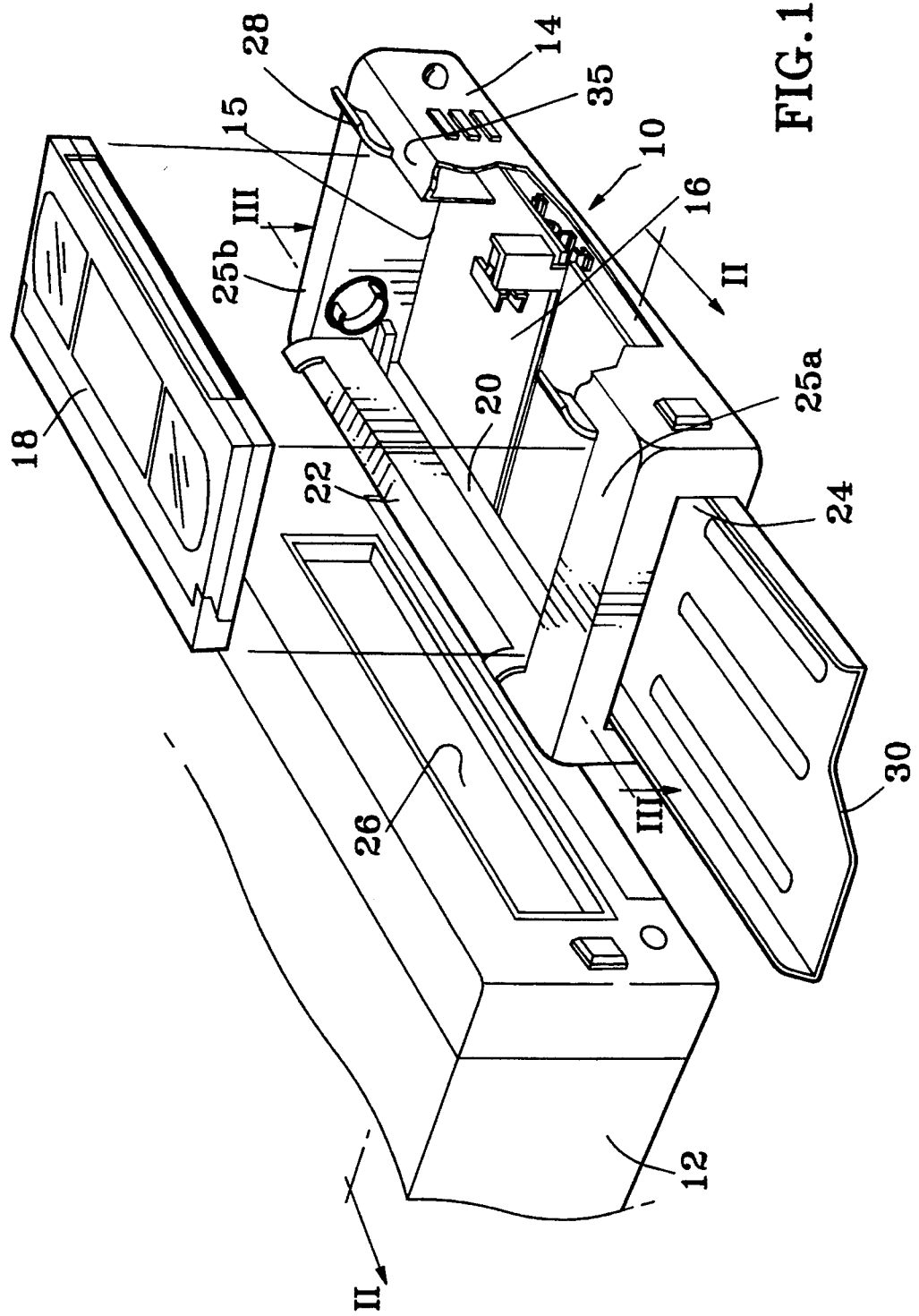
FIG. 1 is a simplified perspective view of a preferred automatic cassette changing device in accordance with the present invention.

Referring now to FIG. 1, there is shown an automatic cassette changing device 10 in accordance with a preferred embodiment of the present invention, which is adapted to be used in combination with a VCR 12. The cassette changing device 10 comprises a main body 14 which includes a rectangular-shaped open space 16 formed therein for receiving one or more video-tape cassettes 18, a cassette entering inlet 20 provided at a rear wall 22 of the main body 14 and communicating with the open space 16 and a cassette access opening 26 of the VCR 12, a cassette discharging outlet 24 formed at a side wall 25a of the main body 14 and communicating with the open space 16 for discharging recorded or reproduced cassettes ejected from the VCR 12.

Preferably, the cassette entering inlet 20 is arranged at the bottom surface 15 of the main body 14 adjoining the open space 16 in a coplanar relationship with each other so as to facilitate the insertion of the cassette into the cassette access opening 26 of the VCR 12. Provided at top edges of the main body 14 adjoining the open space 16 are outwardly bent strips 28 adapted to guide the downward movement of the cassettes 18. A receptacle 30 is attached to the cassette discharging outlet 24 to receive the cassettes ejected from the VCR 12 through the main body 14.

Figure 2:
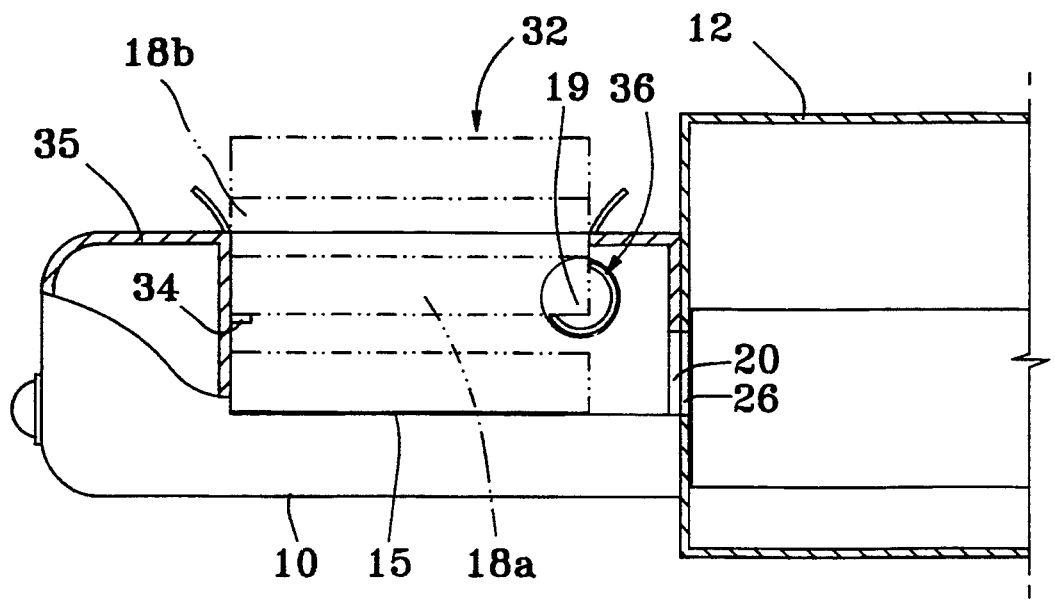
FIG. 2 is a sectional view taken along line II—II of FIG. 1 and shows the cassette changing device of FIG. 1 combined with a VCR.

FIG. 2 shows the cassette changing device 10 in combination with the VCR 12. As shown in FIG. 2, the cassettes as indicated by the dotted line are stacked in the open space 16 of the main body 14. The stacked cassettes 32 are supported by projecting pieces 34 formed at a front wall 35 of the main body 14 and a pair of cassette feeding mechanisms 36 mounted on the side walls 25a, 25b of the main body 14.

Figure 3:
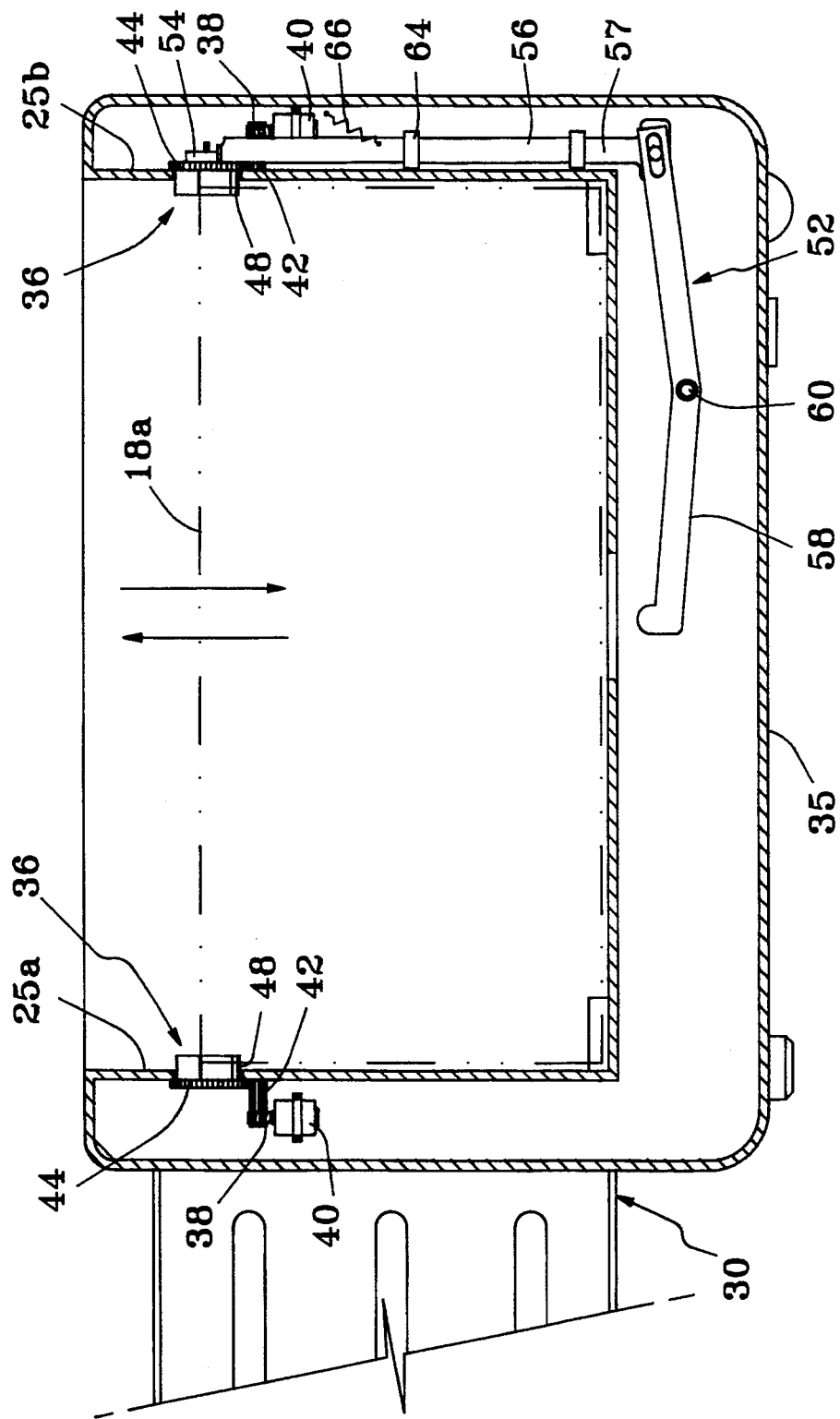
FIG. 3 is a sectional view taken along line III—III of FIG. 1.

FIG. 3 shows the cassette feeding mechanisms 36 of the cassette changing device 10 in accordance with a preferred embodiment of the present invention. The respective cassette feeding mechanisms 36 also serve to drop serially one by one a number of cassettes on the bottom surface 15 of the main body 14 for supplying them to the VCR 12. Since the cassette feeding mechanisms 36 are essentially identical both in operation and mechanical elements, only one of the feeding mechanisms will be described herein with reference to FIGS. 3 and 4.

Figure 4:
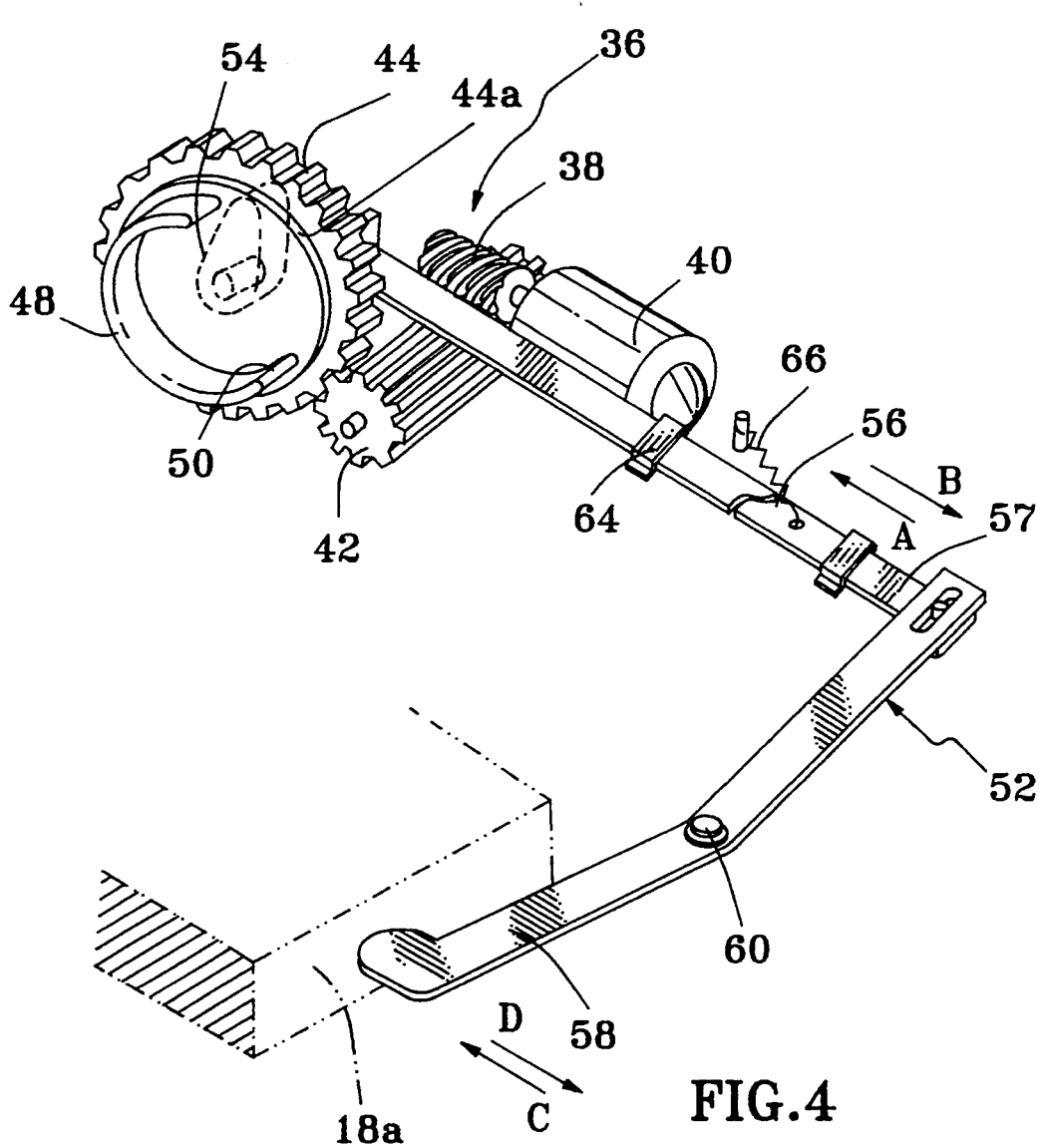
FIG. 4 is a perspective view of an actuating mechanism for feeding a number of cassettes in sequence into a VCR in accordance with the present invention.

The cassette feeding mechanism 36 includes a driving gear 38 driven by a motor 40, an intermediate gear 42 engaged with the driving gear 38, a driven gear 44 meshed with the intermediate gear 42 and a cutout cylindrical holder 48 integrally formed at one side 44a of the driven gear 44. It should be understood that various trains of gears may be employed in the cassette feeding mechanism 36. The cassette feeding mechanisms 36 are actuated synchronously by the motors 40. Preferably, the feeding mechanisms 36 may be driven by a common motor instead of the individual motors 40. As best shown in FIG. 4, the cylindrical holder 48 has a quarter cutout portion 50 adapted to support and grip a rear edge 19 of the cassette 18.

As shown in FIG. 3, in accordance with a preferred embodiment of the present invention, associated with one of the cassette feeding mechanisms 36 is a cassette pushing means 52 for assisting the dropping movement of the cassettes. That is, the cassette pushing means 52 functions to push the lowermost one 18a of the stacked cassettes 32 supported on the projecting pieces 34 of the front wall 35 of the main body 14 and to separate it from the stacked cassettes 32 during the exchanging operation of cassettes.

Figure 6:
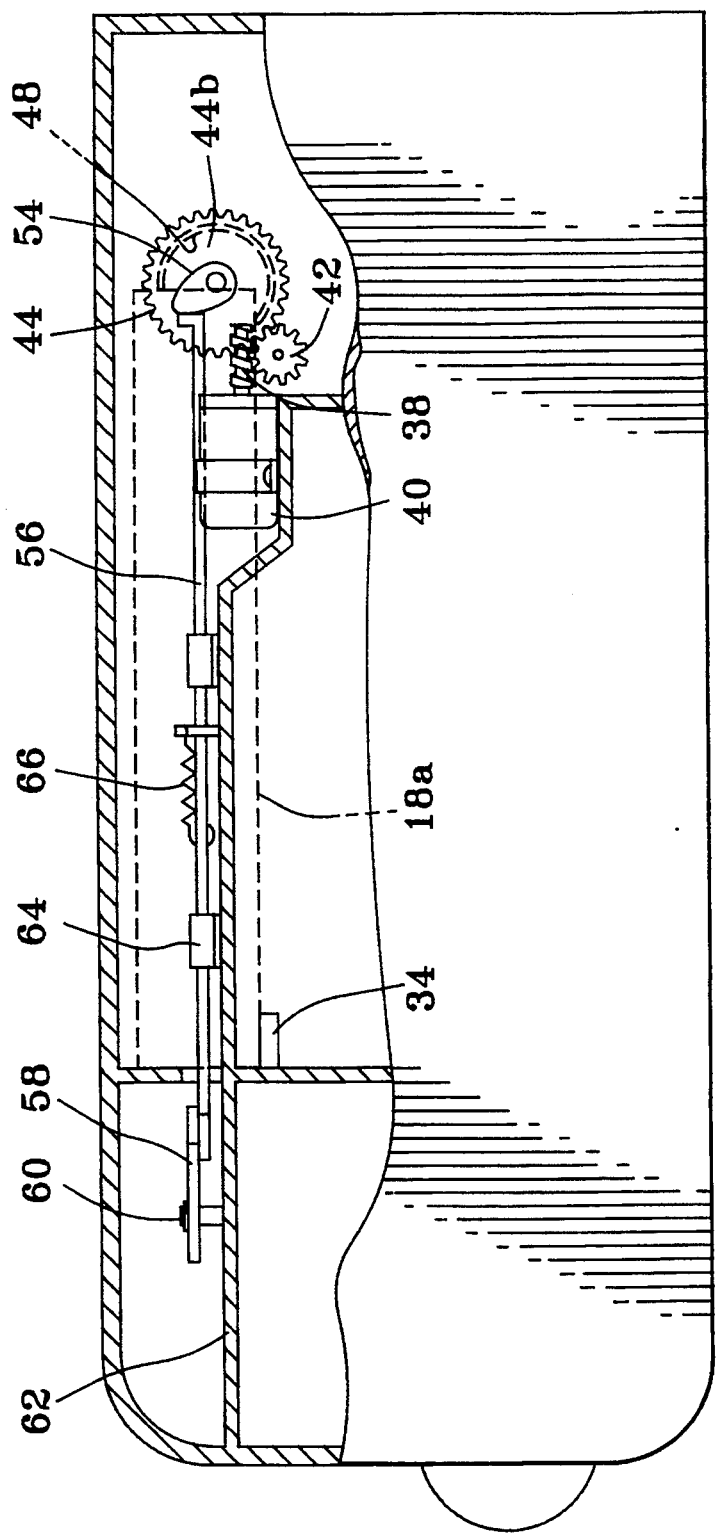
FIG. 6 is a partially cut-away side view of the cassette changing device shown in FIG. 1.

As best shown in FIGS. 4 and 6, the cassette pushing means 52 actuated by the feeding mechanism 36 includes an eccentric cam 54 provided at the other side 44b of the driven gear 44, a cam following slide plate 56 in contact with the cam 54, and a cassette pushing lever 58 hinged at an end portion 57 of the slide plate 56 and rotatably pivoted at a pin 60 fixed to a partition 62 of the main body 14. In addition, attached to the partition 62 of the main body 14 are one or more guide brackets 64 for maintaining the movement of the slide plate 56 in the forward and backward directions as indicated by arrows A,B in FIG. 4 during the rotating operation of the eccentric cam 54 (see FIG. 6). As shown in FIG. 4, secured to the slide plate 56 is a tensile spring 66 for biasing the slide plate 56 against the eccentric cam 54. Therefore, the eccentric motion of the cam 54 will cause the cassette pushing lever 58 to be moved forward and backward as indicated by arrows C,D through the slide plate 56.

Figure 5:
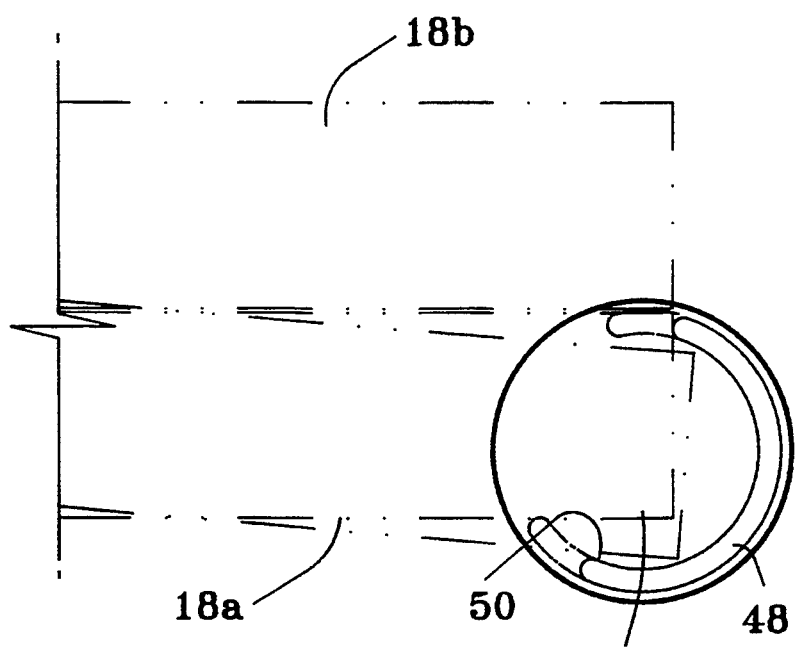
FIG. 5 shows the cassette dropping operation of the cassette feeding mechanism shown in FIG. 4.

In accordance with a preferred embodiment of the present invention, the procedure of exchanging a number of cassettes will now be described hereinbelow. As shown in FIG. 2, in order to feed the lowermost one 18a of the stacked cassettes 32 to the VCR 12 for the purpose of recording or reproducing the cassettes in sequence, the motor 40 drives to actuate the cassette feeding mechanism 36. As a result, the driving force of the motor 40 is transferred to the driven gear 44 via the driving gear 38 and the intermediate gear 42 (see FIG. 4). Therefore, the cutout cylindrical holder 48 is rotated, thereby causing the lowermost cassette 18a seated in the cutout portion 50 thereof to be moved downward(see FIG. 5). At that time, the outer surface of the cutout cylindrical holder 48 commences to support the bottom surface of a next cassette 18b. A further rotation of the holder 48 will result in the liberation of the rear portion 19 of the lowermost cassette 18a from the cutout portion 50 of the cylindrical holder 48. In addition, the rotation of the driven gear 44 causes the slide plate 56 to be moved backward as indicated by the arrow B in FIG. 4 through the actuation of the eccentric cam 54, thereby enabling the cassette pushing lever 58 to rotate clockwise about the pin 60 as indicated by arrow C in FIG. 4. Accordingly, a free end of the pushing lever 58 pushes the lowermost cassette 18a supported on the projections 94 of the main body 14 in the horizontal direction at, the substantially same time as the release of the rear portion 19 of the cassette 18a from the cylindrical holder 48, and, thereby, the cassette 18a can be easily and speedily dropped on the bottom surface 15 of the main body 14 without extra power consumption of the motor. The dropped cassette 18a is inserted into the cassette access opening 26 of the VCR 12 through the cassette entering inlet 20 of the main body 14 by way of an appropriate actuating mechanism(not shown).

Thereafter, the next cassette 18b becomes seated on the projections 34 of the main body 14 and in the cutout portion 50 of the cylindrical holder 48 immediately after one revolution of the holder 48 has been completed. In this case, the eccentric cam 94 is reinstated at an original position and the cam following slide plate 56 is moved forward by the restoring force of the tensed spring 66 to thereby cause the cassette pushing lever 58 to be rotated counterclockwise about the pin 60 as indicated by the arrow D in FIG. 4 and to be restored at a retracted position remote from the front portion of the cassette. Accordingly, one cassette feeding cycle of the cassette changing device 10 is completed through the steps as described above.

On the other hand, the cassette changing device 10 initiates a subsequent cassette changing cycle after the fed cassette 18a has been recorded or reproduced and ejected from the VCR 12 and then removed from the body 14 through the discharging outlet 24 of the body 14 by a cassette discharging mechanism (not shown). Such cassette changing cycles are repeatedly performed for a required number of times.

While the present invention has been shown and described with reference to particular embodiments, it will be apparent to those skilled in the art that many changes and modifications may be made without departing from the spirit and scope of the invention as defined in the claims that follow.

What is claimed is:

1. An automatic video-tape cassette changing device adapted to be used in combination with a recording and reproducing apparatus, which comprises:

a main body having a rectangular-shaped open space provided on a bottom surface thereof for receiving one or more stacked video-tape cassettes, a cassette entering inlet provided at a rear wall of the main body in a coplanar relationship with the bottom surface and communicating with the open space and a cassette access opening of said apparatus, and a cassette discharging outlet formed at a side wall of the main body and communicating with the open space for discharging recorded or reproduced cassettes ejected from said apparatus;

projecting pieces provided at a front wall of the main body and adapted for supporting the stacked cassettes;

a pair of cassette feeding mechanisms mounted on the side walls of the main body in an opposite relationship with each other for dropping cassettes in sequence on the bottom surface of the main body, each of said cassette feeding mechanisms including a driving gear driven by a motor, an intermediate gear engaged with the driving gear, a driven gear meshed with the intermediate gear, and a cutout cylindrical holder integrally formed at a first side of the driven gear and suitable for gripping the lowermost one of the stacked cassettes; and cassette pushing means associated with one of the cassette feeding mechanisms for pushing the lowermost cassette supported on said projecting pieces of the front wall of the main body in a horizontal direction and separating it from the stacked cassettes by the actuation of said one of the cassette feeding mechanisms at the substantially same time as the release of a rear portion of the lowermost cassette from the cutout cylindrical holders takes place, said cassette pushing means including an eccentric cam provided at a second side of the driven gear, a cam following slide plate in contact with the eccentric cam, a pushing lever hinged at an end portion of the slide plate and rotatably pivoted at a pin fixed to a partition of the main body for pushing a front portion of the lowermost cassette through the movement of the slide plate in the rotating motion of the eccentric cam, and means for biasing the slide plate against the eccentric cam.

2. The cassette changing device of claim 1, wherein said biasing means is a tensile spring secured to the slide plate.

* * * * *